(12) United States Patent  
Sarkar

(10) Patent No.: US 8,000,538 B2
(45) Date of Patent: Aug. 16, 2011

(54) SYSTEM AND METHOD FOR PERFORMING CLASSIFICATION THROUGH GENERATIVE MODELS OF FEATURES OCCURRING IN AN IMAGE

(75) Inventor: Prateek Sarkar, Sunnyvale, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1147 days.

(21) Appl. No.: 11/644,776

(22) Filed: Dec. 22, 2006

(65) Prior Publication Data

US 2008/0152238 A1 Jun. 26, 2008

(51) Int. Cl.
G06K 9/62 (2006.01)
(52) U.S. Cl. ........................................ 382/228; 382/224
(58) Field of Classification Search .................. 382/228, 382/118

See application file for complete search history.

(56) References Cited

OTHER PUBLICATIONS

Lu et al: "Head gesture recognition based on Bayesian network", Springer-Verlag Berlin Heidelberg, pp. 492499, 2005.*

Lienhart et al: "An extended set of Haar-like features for rapid object detection", IEEE ICIP, pp. I-900-I-993, 2002.*

Meng et al: "An image-based Bayesian framework for face detection", IEEE, 2000.*

P. Viola et al., "Rapid Object Detection Using a Boosted Cascade of Simple Features," Proc. CVPR, pp. 511-518 (2001).

C. Shin et al., "Classification of Document Pages Using Structure-Based Features," Int'l Journal of Document Analysis and Recognition, pp. 232-247 (2000).

\* cited by examiner

*Primary Examiner* — Samir A Ahmed
*Assistant Examiner* — Ruiping Li
(74) *Attorney, Agent, or Firm* — Patrick J. S. Inouye

(57) ABSTRACT

A system and method for image performing classification through generative models of features occurring in an image. Category-conditional probability distributions of features occurring in a plurality of training images are maintained. Each distribution is assigned to a category. The features occurring in an unclassified image are identified. Category-conditional likelihoods for the identified features are determined using the category-conditional probability distributions for each category. The unclassified image is assigned to one such category based upon the category-conditional likelihoods.

30 Claims, 4 Drawing Sheets

SYSTEM AND METHOD FOR PERFORMING CLASSIFICATION THROUGH GENERATIVE MODELS OF FEATURES OCCURRING IN AN IMAGE

FIELD

This application relates in general to image classification and, in particular, to a system and method for performing classification through generative models of features occurring in an image.

BACKGROUND

Digital images can now be easily exchanged and manipulated for a wide range of purposes, both business and personal. Digital images include both pictorial data and digitalized facsimiles of textual documents provided in lieu of hard copies. In response to the wider adoption of these digital equivalents to conventional printed documents, office and personal productivity devices have begun to incorporate digitizers and similar means for directly converting printed content into digital images. Devices, such as copiers, scanners, and digital-capable facsimile machines, can rapidly generate electronically equivalent versions of paper documents. However, further processing is generally needed to put raw converted digital data into usable form, such as needed for word processing or data analysis. The form of processing required depends upon the type of document being converted and includes, for instance, indexing and retrieval, sorting and organization, and automated analysis tasks. Therefore, digital images must often be classified prior to undertaking any further processing steps.

Post-digitization classification of digital images can be problematic where a high volume of documents are being converted, thereby rendering manual classification impracticable. Currently, approaches, such as template matching, discriminative models based on high level feature extraction, ad hoc rule-based systems, and word shape recognition, are used for image classification, but each approach has its shortcomings. Template matching, for instance, can fail due to slight variations in input features identified on digital images, such as caused by translation skew, scaling, extraneous markings, paper folds, or missing parts.

Similarly, high level feature extraction uses content analysis through optical character recognition ("OCR") or layout analysis. OCR digitally converts image data into text, which can be semantically analyzed to help classify the document. OCR-assisted text-classification works most effectively when the document includes text of sufficient type, quality, and quantity. Moreover, textual data may be insufficient for properly classifying pictorial or form documents, such as income tax returns, which provide scant textual data. Lastly, OCR may not be available in the language of the document.

Layout analysis employs document signatures that are used as category prototypes against which digital images are compared. The prototypes can include features extracted from idealized category examples. Document images are classified according to the closest matching prototype. Layout analysis has narrow applicability due to the significant effort needed to create the prototypes and variations in feature arrangement can cause misidentification or rejects.

Ad hoc rule-based systems look for user-specified features that characterize different categories of documents. These systems evolve by trial and error and easily fail for document images containing features falling outside the assumptions inherent to the model. Moreover, adding in new document categories requires the redefinition of feature discriminative boundaries.

Finally, word shape recognition operates on models of document images that have been segmented by a layout analysis system. Parsed word shapes are applied to a discriminative decision tree to identify an appropriate category. However, word shape recognition requires training using extensive samples of word shapes.

Therefore, there is a need for an approach to performing digital document and image classification that accommodates variability in features without relying upon template matching, heuristic rules, or high level feature classification, such as OCR.

SUMMARY

A system and method for classifying input document images into categories through a generative model of features. Images are classified by evaluating intensity variations to recognize features, which can include low level features, such as Haar filter features. Those filter responses that exceed a threshold result in a feature "firing" that is added to a feature list for the document. The lengths of the feature lists are variable due to the variability in input images and scale can be varied by adjusting the image or filter size. The feature firings are modeled as points in a scatter diagram. Each document category is represented as a probability distribution against which the scatter diagram is evaluated to identify the most likely category.

One embodiment provides a system and method for performing classification through generative models of features occurring in an image. Category-conditional probability distributions of features occurring in a plurality of training images are maintained. Each distribution is assigned to a category. The features occurring in an unclassified image are identified. Category-conditional likelihoods for the identified features are determined using the category-conditional probability distributions for each category. The unclassified image is assigned to one such category based upon the category-conditional likelihoods.

Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

System

Figure 1:
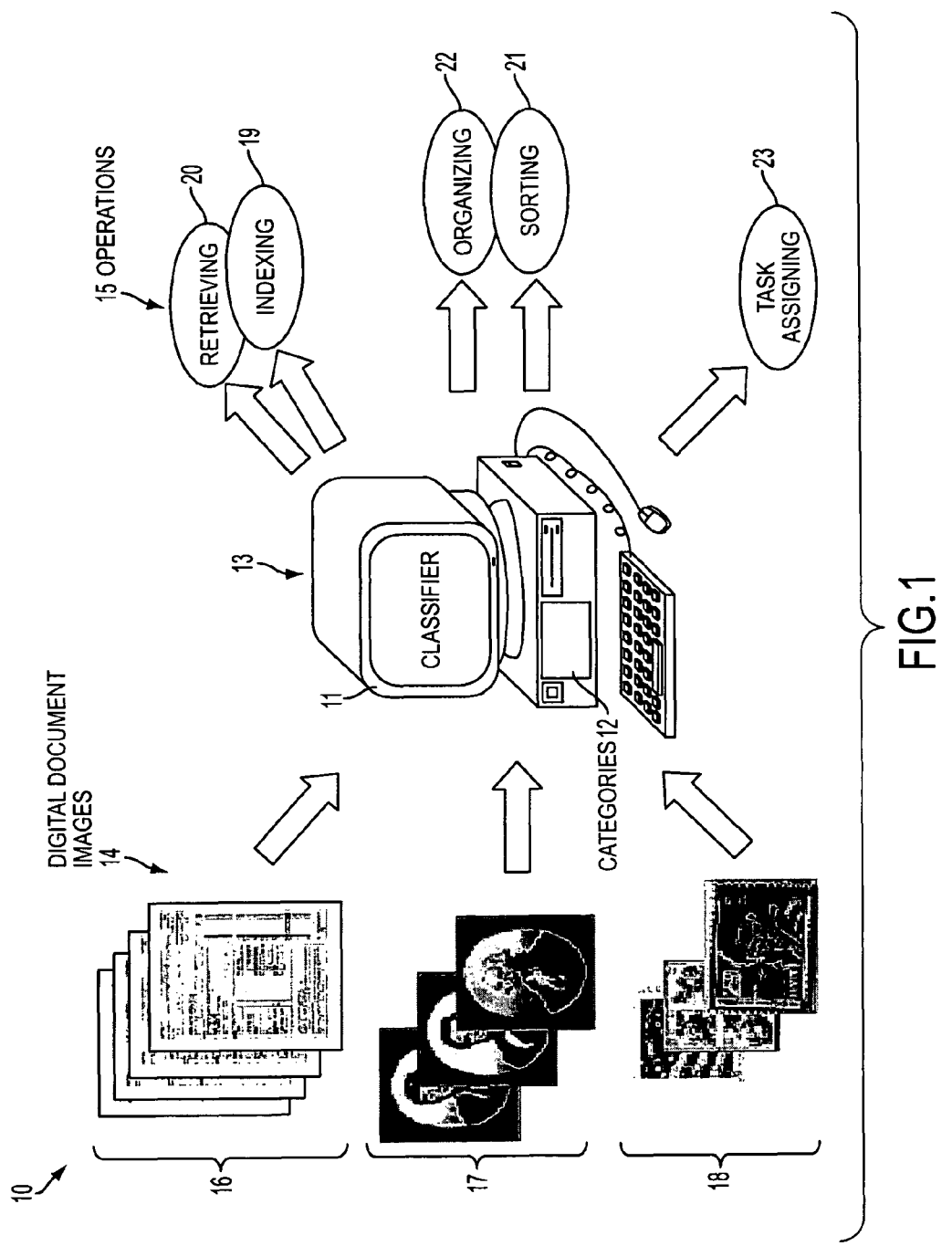
FIG. 1 is a block diagram showing a system for performing classification through generative models of features occurring in an image, in accordance with one embodiment.

Image classification can be performed within the larger context of document image analysis and can include analyzing and assigning a digital document image into one or more predefined categories to aid in subsequent analysis. FIG. 1 is a block diagram showing a system 10 for performing classification through generative models of features occurring in an image, in accordance with one embodiment. As used herein, the terms "digital image," "document image," "digitized document," and "digitized facsimile" are used interchangeably and refer to a digital image representation of a printed document that can include any combination of text, pictures, graphics, and the like.

In one form of image analysis, image classification is performed by a classifier 11, which operates on a computer system 13 to assign input document images 14 into specific categories 12. Image classification can also be performed as a stand alone function without reference to image analysis. Document images 14 can include, for instance, form and preprinted documents 16, such as income tax return forms; pictorial data 17, such as portraits of U.S. presidents; and mixed data 18, such as digital representations of postage stamps, which include both pictorial and textual data. Other types of document images 14 are possible.

The classifier 11 analyses each document image 14 and determines the most likely category 12 to which the document image 14 belongs. In a further embodiment, the classifier 11 can determine more than one category 12. The categories 12 specify a set of category labels that are associated with those types of digital images that are recognized by the classifier 11, which uses generative feature modeling, as further described below beginning with reference to FIG. 2 et seq. Following classification, operations 15 can be performed on the document images 14. By way of example, the operations 15 can include indexing 19 and retrieving 20 textual and other data derived from the input images 14, as well as sorting 21 and organizing 22 the derived data. Additionally, task assigning 23 can direct the document images 14 to appropriate post-classification processing, including OCR, layout analysis, and word shape code analysis. Other operations 15 are possible.

Preferably, the computer system 13 is a general-purpose computing workstation, such a personal desktop or notebook computer, for executing software programs. The computer system 13 includes components conventionally found in computing devices, such as, a central processing unit, memory, network interface, persistent storage, and components for network interconnectivity. The classifier 13 can also be implemented in hardware as a microprogrammed device or dedicated computation module. Other systems and components are possible.

Method

Figure 2:
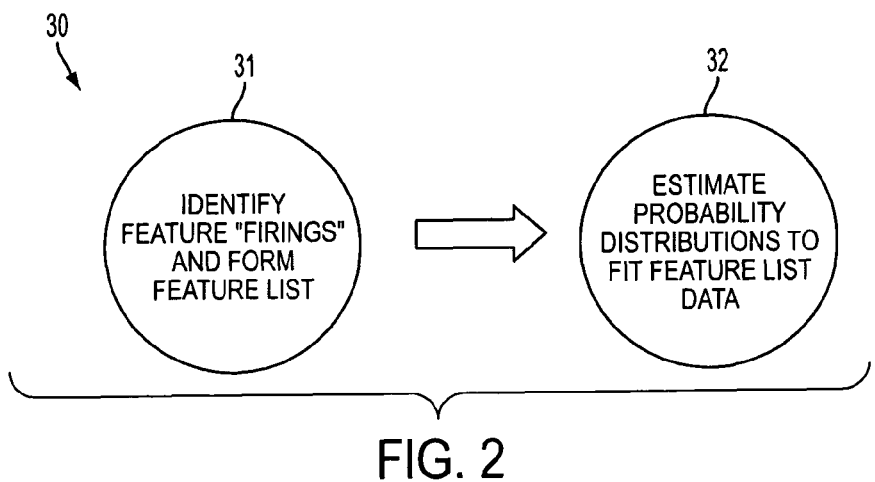
FIG. 2 is a process flow diagram showing a method for performing classification through generative models of features occurring in an image, in accordance with one embodiment.

Image classification assigns input digital images to one or more categories based on features identified in each image. FIG. 2 is a process flow diagram showing a method 30 for performing classification through generative models of features occurring in an image, in accordance with one embodiment. The generative feature model can be generated through training over a set of sample documents to specify the feature set characteristics of each category 12, or can be provided as a predefined model built manually or through automated means.

Initially, features in each image are identified, for example, by evaluating feature filter responses to intensity variations of a luminance channel representation of the unclassified image in one of bi-level, that is, black and white, grayscale, or color images. Each feature filter response that meets a preset threshold results in a feature "firing" that is added as an element into a feature list for the image (operation 31), as further described below with reference to FIG. 3. Each feature firing in the feature list is recorded, such as further described below with reference to FIG. 6. Finally, probability distributions for each of the categories 12 are fit to the recorded feature lists to estimate category-conditional feature-likelihood functions (operation 32), as further described below with reference to FIG. 6. A category label can then be assigned to the document image 41 based upon best or maximum category-conditional likelihoods, reasonable likelihoods, or only if the likelihoods satisfy a confidence threshold. Otherwise, the document image 41 can be classified as unrecognizable or of an unknown category. In a further embodiment, category assignments are based upon approximate, rather than exact, category-conditional likelihoods.

Feature List Generation

Figure 3:
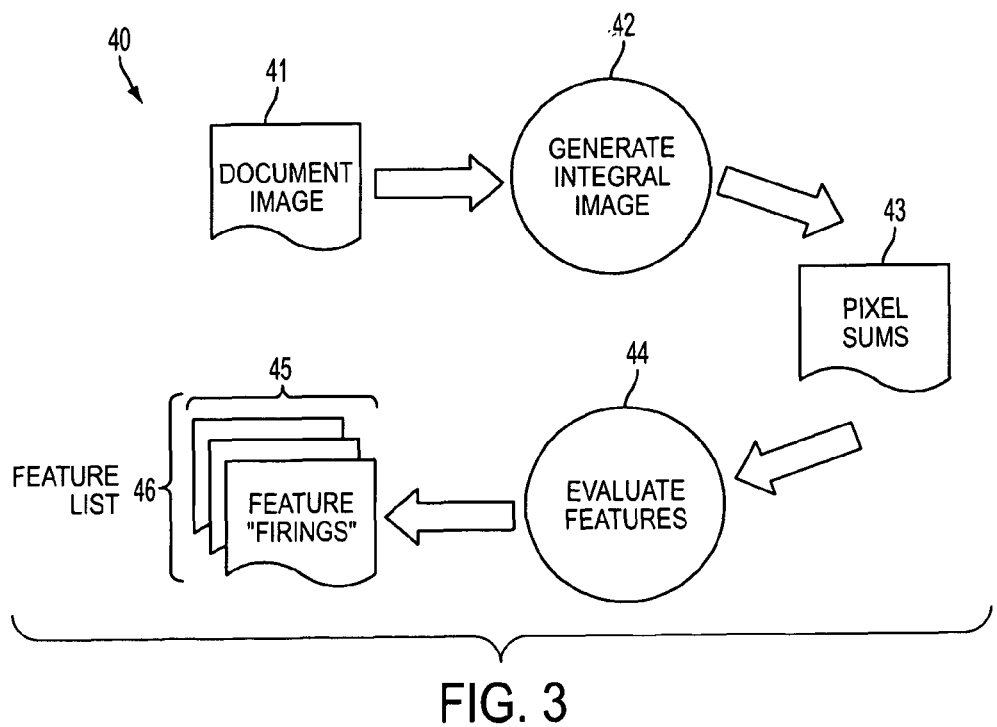
FIG. 3 is a process flow diagram showing a routine for generating a feature list for use in the method of FIG. 2.

A feature list is the list of features that were identified in an image, and can be of a variable length due to the variability in input images. The feature list is matched to generative models that are specific to each category. FIG. 3 is a process flow diagram showing a routine for generating a feature list for use in the method of FIG. 2. In one embodiment, the features identified in each document image 41 are a form of Haar filters, also known as Viola-Jones rectangular filters, such as described in P. A. Viola and M. J. Jones, "Rapid Object Detection Using a Boosted Cascade of Simple Features," *Proc. CVPR*, pp. 511-518 (2001), the disclosure of which is incorporated by reference. As implemented the features are a subset of Viola-Jones rectangular filters, as further described below with reference to FIG. 5, although other types of features, filters, and visual artifacts are possible, including other forms of Haar filters, steerable filters, Gabor filters, wavelet filters, edge-detection filters, light-dark intensity transition counts, texture features, morphological features, connected components, and higher level object detectors.

Each document image 41 is first converted into an intermediate representation by generating an integral image (operation 42), which, for monochrome images, consists of intensity variations. An integral image enables rapid feature evaluation in a single computational pass through the accumulation of pixel sums 43, as described in Id. at pp. 512-513. Identified features are evaluated (operation 44) to form a feature list 46. If a pixel sum 43 satisfies a preset threshold criteria, a feature entry is logged as a feature "firing" 45 and is added to the feature list 46.

Features

Figure 4:
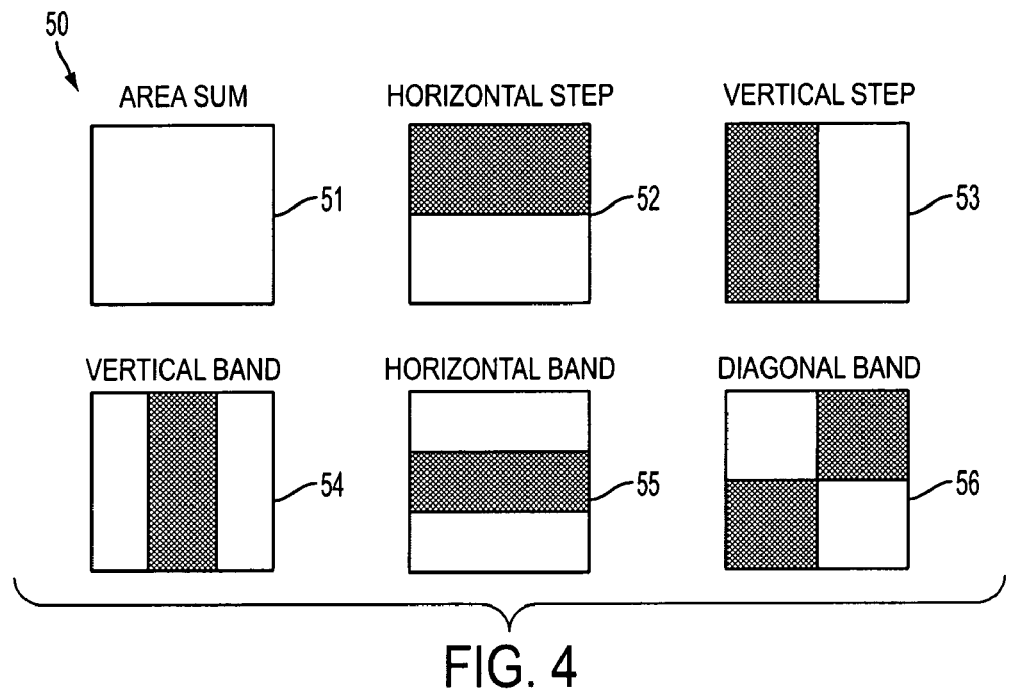
FIG. 4 is a block diagram showing, by way of example, Haar filters.

In one embodiment, each feature firing represents a filter response measurement of the document image 41 that has been taken at some location in the image for one type of feature and one scale. FIG. 4 is a block diagram showing, by way of example, Viola-Jones rectangular filters 50, also called Haar filters. The types of Viola-Jones rectangular filters evaluated include area sum 51, horizontal step 52, vertical step 53, vertical band 54, horizontal band 55, and diagonal band 56. For each type of filter, the sum of pixel intensities in the dark part of each filter is subtracted from the sum of pixel densities in the light part to evaluate filter response.

Figure 5:
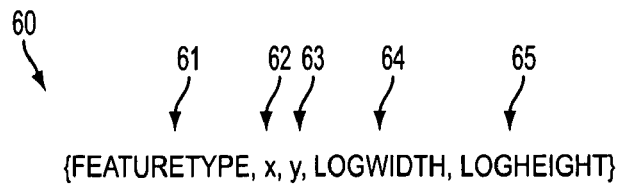
FIG. 5 is a data structure diagram showing, by way of example, a schema for a quintuple for storing a feature list entry.

Each feature firing 45 is stored as an element in the form of a quintuple in a feature list 46. FIG. 5 is a data structure diagram showing, by way of example, a schema for a quintuple 60 for storing a feature list entry. Each quintuple 60 includes the type 61 of feature; x- and y-coordinates 62, 63 within the document image 41; and logarithms of the width 64 and height 65 of the feature. The feature dimensionality corresponds to the number of elements in the quintuple 61, which is five, although the length of the feature list N is variable due to differences in input digital images 41. Other data structures and schemas are possible.

Classification

Each image to be classified is represented by a feature list 46 of salient features $[x_1, x_2, \ldots, x_N]$. The length of each features list, N, can vary from image to image. The document image 41 corresponding to each feature list 46 is assigned to one of C pre-specified categories in the set $S=\{1, 2, \ldots, C\}$. In one embodiment, the category is assigned by maximizing the likelihood. The category $c_{ML}$ of an observed image is determined as:

$$c_{ML} = \operatorname*{argmax}_{c \in S} p(x_i, \ldots, x_N \mid c) = \operatorname*{argmax}_{c \in S} \prod_{n=1}^{N} p(x_n \mid c)$$

where c denotes an integer that represents a specific category, such that $0 < c \leq C$; $c_{ML}$ is the maximum likelihood category.

Image categories are distinguished through category-conditional feature-likelihood functions $p(x_n|c)$. Each feature $x_n$ is a D-dimensional vector of measurements or attributes $[x_{n1}, x_{n2}, \ldots, x_{nD}]$. In one embodiment, for each category, the likelihood function, $p(x_n|c)$, is modeled using a latent conditionally independent probability distribution model, as a mixture of K independent components, which is expressed as:

$$p(x_n \mid c) = \sum_{k=1}^{K} p_k(c) \prod_{d=1}^{D} p_k(x_{nd} \mid c)$$

where k denotes an independent component, $0 \leq k \leq K$; and d denotes a dimension, $1 \leq d \leq D$. Thus, $x_{nd}$ denotes the value of the $d^{th}$ dimension of feature $x_n$; $p_k(c)$ denotes a category-conditional probability that a feature is generated from the $k^{th}$ mixture component; $p_k(x_n|c)$ denotes the category-and-latent conditional likelihood that a feature, $x_n$, has $x_{nd}$ as the value of its $d^{th}$ dimension. The likelihood functions are constructed from densities, such as Gaussian, exponential, beta, gamma, and Laplace distributions, for continuous valued attributes; and from distributions, such as a multinomial probability mass function, when the attributes are discrete with a finite number of values.

Figure 6:
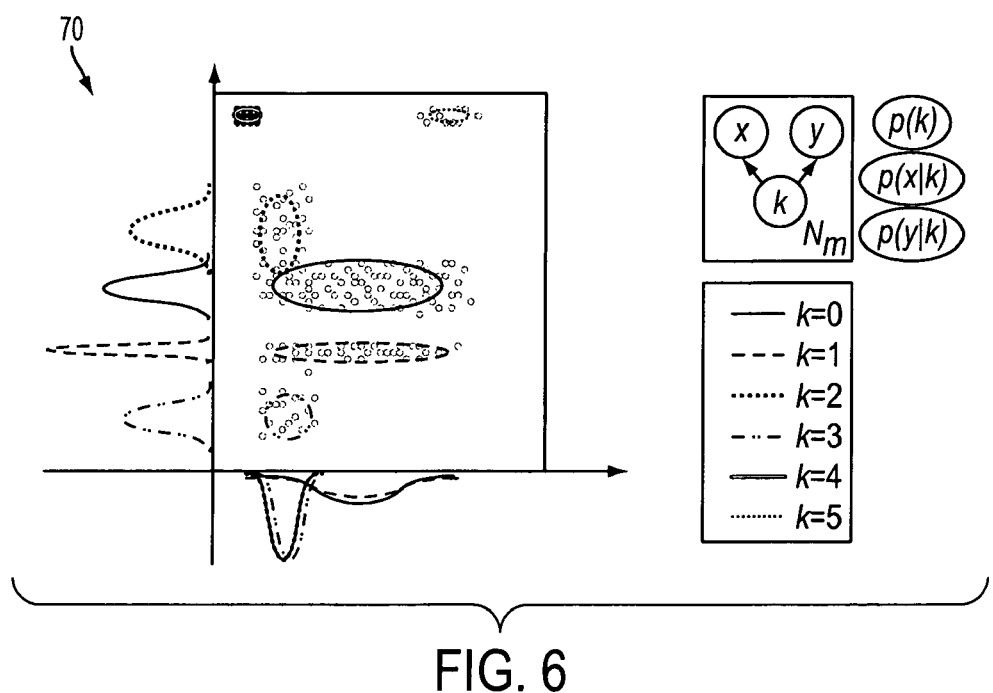
FIG. 6 is a scatter diagram showing, by way of example, feature firing points for a feature list.

The feature firings 45 in each feature list 46 can be diagrammatically depicted as points, such as using a scatter diagram, although other forms of representation or visualization are possible. FIG. 6 is a scatter diagram 70 showing, by way of example, feature firing points for a feature list 46. The x- and y-axes respectively represent the x- and y-coordinates of a document image 41.

To allow viewing in two dimensions, the scatter diagram 70 only shows x- and y-coordinate points for each feature firing 45 for a document image 41, such as that of a business letter. In the example, the points are formed into six groups $0 \leq k \leq 5$ based upon their groupings in the document image 41. The latent conditional independence model can be expressed as:

$$p(x,y) = \Sigma_k p(k) p(x|k) p(y|k)$$

Thus, in five dimensions, the latent conditional independence model can be expressed as:

$$p(f,w,h,x,y) = \Sigma_k p(k) p(f|k) p(w|k) p(h|k) p(x|k) p(y|k)$$

where f denotes feature type; w denotes the logarithm of feature width; and h denotes the logarithm of feature height. When the model is applied to form one latent conditional independence expression per category c, the model becomes:

$$p(f,w,h,x,y) = \Sigma_k p(k|c) p(f|k,c) p(w|k,c) p(h|k,c) p(x|k,c) p(y|k,c)$$

An expectation maximization algorithm can be used to train each model.

While the invention has been particularly shown and described as referenced to the embodiments thereof, those skilled in the art will understand that the foregoing and other changes in form and detail may be made therein without departing from the spirit and scope.

What is claimed is:

1. A system for performing classification through generative models of features occurring in an image, comprising:
   stored category-conditional probability distributions of features with one such category-conditional probability distribution assigned to each of a plurality of image categories; and
   a classifier, comprising:
      a feature identifier to assign each of a plurality of training images stored to one of the image categories, to identify features occurring in each training image, to retrieve an unclassified image, and to identify the features occurring in the unclassified image, wherein each of the identified features are represented as an element in a feature list having a variable length, each element comprising a value in a chosen space of features that comprises one or more dimensions and the value comprising measurements along each of the dimensions being either continuous or discrete valued;
      a likelihood evaluator to evaluate the identified features against the category-conditional probability distributions for each of the image categories; and
      a categorizer to assign the unclassified image to one image category by maximizing the category-conditional likelihood of the category-conditional probability distribution of the identified features; and
   a processor to process the unclassified image based on the one image category by converting the unclassified image.

2. A system according to claim 1, wherein the chosen space of features comprises five such dimensions and wherein each feature element $x_n$ is expressed by the quintuple:

$$x_n = [f, x, y, \log w, \log h]$$

where n denotes an integer, such that $0 < n \leq N$ and N denotes a total number of the features; f comprises a type of feature; x and y comprise coordinates of the feature within the unclassified image; and w and h respectively comprise a width and height of the feature, or their respective logarithms.

3. A system according to claim 1, further comprising:
   an image analyzer to take a measurement of the unclassified image for each feature, comprising one or more locations, one or more scales, and one or more feature types.

4. A system according to claim 1, wherein a luminance channel representation of the unclassified image are examined in one of bi-level, grayscale, and color.

5. A system according to claim 1, wherein the features comprise one or more of Haar filters, steerable filters, Gabor filters, wavelet filters, edge-detection filters, light-dark intensity transition counts, texture features, morphological features, connected components, and higher level object detectors.

6. A system according to claim 1, wherein the category-conditional likelihoods are determined as a product of the category-conditional likelihoods for each of the identified features for the unclassified image.

7. A system according to claim 6, further comprising:
an analyzer to evaluate each category-conditional likelihood of occurrence $p(x_n|c)$ as a latent conditionally independent distribution model expressed by the equation:

$$p(x_n \mid c) = \sum_{k=1}^{K} p_k(c) \prod_{d=1}^{D} p_k(x_{nd} \mid c)$$

where k is an index to an independent component, $0 \leq k \leq K$; d denotes a dimension index, $1 \leq d \leq D$; $x_{nd}$ denotes a value of the $d^{th}$ dimension of feature $x_n$;
$p_k(c)$ denotes a category-conditional probability that a feature is generated from the $k^{th}$ independent component;
$p_k(x_n|c)$ denotes a category-and-latent conditional likelihood that a feature, $x_n$, has $x_{nd}$ as a value of its $d^{th}$ dimension.

8. A system according to claim 7, wherein for the dimensions comprise continuous valued attributes and each category-and-latent conditional likelihood is modeled as a univariate Gaussian density for each such continual dimension.

9. A system according to claim 7, wherein for the dimensions comprise discrete finite valued attributes and each category-and-latent conditional likelihood is modeled as a multinomial probability mass function for each such discrete dimension.

10. A system according to claim 6, further comprising:
an estimator to approximate each likelihood of occurrence $p(x_n|c)$ as a latent conditionally independent distribution model expressed by the equation:

$$p(x_n \mid c) = \underset{k \in K}{\mathrm{argmax}} \prod_{d=1}^{D} p_k(x_{nd} \mid c)$$

where k is an index to an independent component, $0 \leq k \leq K$; d denotes a dimension index, $1 \leq d \leq D$; $x_{nd}$ denotes a value of the $d^{th}$ dimension of feature $x_n$;
$p_k(c)$ denotes a category-conditional probability that a feature is generated from the $k^{th}$ independent component;
$p_k(x_n|c)$ denotes a category-and-latent conditional likelihood that a feature, $x_n$, has $x_{nd}$ as a value of its $d^{th}$ dimension.

11. A system according to claim 1, wherein the unclassified image is assigned to the category for which the category-conditional likelihoods are highest.

12. A system according to claim 1, wherein a category label is assigned to the unclassified image if the category-conditional likelihoods satisfy a confidence threshold, wherein the unclassified image is assigned an unrecognizable or unknown category label upon failure of the confidence threshold.

13. A system according to claim 1, wherein the unclassified image is assigned to a category according to one of approximate and exact values for the category-conditional likelihoods.

14. A system according to claim 1, wherein the category-conditional probability distributions are estimated from training images that are each assigned to one or more of the categories.

15. A method for performing classification through generative models of features occurring in an image, comprising:
assigning each of a plurality of training images to one of a plurality of image categories;
identifying features occurring in each training image;
determining category-conditional probabilities of the features for each of the training images for their respective image categories;
maintaining the category-conditional probability distributions of features with one such category-conditional probability distribution assigned to each of the image categories;
retrieving an unclassified image and identifying the features occurring in the unclassified image;
representing each of the identified features as an element in a feature list having a variable length, each element comprising a value in a chosen space of features that comprises one or more dimensions and the value comprising measurements along each of the dimensions being either continuous or discrete valued;
evaluating the identified features against the category-conditional probability distributions for each of the image categories;
assigning the unclassified image to one image category by maximizing the category-conditional likelihood of the category-conditional probability distribution of the identified features; and
processing the unclassified image based on the one image category by converting the unclassified image.

16. A method according to claim 15, wherein the chosen space of features comprises five such dimensions and wherein each feature element $x_n$ is expressed by the quintuple:

$$x_n = [f, x, y, \log w, \log h]$$

where n denotes an integer, such that $0 < n \leq N$ and N denotes a total number of the features; f comprises a type of feature; x and y comprise coordinates of the feature within the unclassified image; and w and h respectively comprise a width and height of the feature or their respective logarithms.

17. A method according to claim 15, further comprising:
taking a measurement of the unclassified image for each feature, comprising one or more locations, one or more scales, and one or more feature types.

18. A method according to claim 15, further comprising:
examining a luminance channel representation of the unclassified image in one of bi-level, grayscale, and color.

19. A method according to claim 15, wherein the features comprise one or more of Haar filters, steerable filters, Gabor filters, wavelet filters, edge-detection filters, light-dark intensity transition counts, texture features, morphological features, connected components, and higher level object detectors.

20. A method according to claim 15, further comprising:
determining the category-conditional likelihoods as a product of the category-conditional likelihoods for each of the identified features for the unclassified image.

21. A method according to claim 20, further comprising:
evaluating each category-conditional likelihood of occurrence $p(x_n|c)$ as a latent conditionally independent distribution model expressed by the equation:

$$p(x_n|c) = \sum_{k=1}^{K} p_k(c) \prod_{d=1}^{D} p_k(x_{nd}|c)$$

where k is an index to an independent component, $0 \leq k \leq K$; d denotes a dimension index, $1 \leq d \leq D$; $x_{nd}$ denotes a value of the $d^{th}$ dimension of feature $x_n$;

$p_k(c)$ denotes a category-conditional probability that a feature is generated from the $k^{th}$ independent component;

$p_k(x_n|c)$ denotes a category-and-latent conditional likelihood that a feature, $x_n$, has $x_{nd}$ as a value of its $d^{th}$ dimension.

22. A method according to claim 21, wherein for the dimensions comprise continuous valued attributes and each category-and-latent conditional likelihood is modeled as a univariate Gaussian density for each such continual dimension.

23. A method according to claim 21, wherein for the dimensions comprise discrete finite valued attributes and each category-and-latent conditional likelihood is modeled as a multinomial probability mass function for each such discrete dimension.

24. A method according to claim 20, further comprising:
approximating each likelihood of occurrence $p(x_n|c)$ as a latent conditionally independent distribution model expressed by the equation:

$$p(x_n|c) = \underset{k \in K}{\operatorname{argmax}} \prod_{d=1}^{D} p_k(x_{nd}|c)$$

where k is an index to an independent component, $0 \leq k \leq K$; d denotes a dimension index, $1 \leq d \leq D$; $x_{nd}$ denotes a value of the $d^{th}$ dimension of feature $x_n$; $p_k(c)$ denotes a category-conditional probability that a feature is generated from the $k^{th}$ independent component; $p_k(x_n|c)$ denotes a category-and-latent conditional likelihood that a feature, $x_n$, has $x_{nd}$ as a value of its $d^{th}$ dimension.

25. A method according to claim 15, wherein the unclassified image is assigned to the category for which the category-conditional likelihoods are highest.

26. A method according to claim 15, further comprising:
assigning a category label to the unclassified image if the category-conditional likelihoods satisfy a confidence threshold, wherein the unclassified image is assigned an unrecognizable or unknown category label upon failure of the confidence threshold.

27. A method according to claim 15, further comprising:
assigning the unclassified image to a category according to one of approximate and exact values for the category-conditional likelihoods.

28. A method according to claim 15, further comprising:
estimating the category-conditional probability distributions from training images that are each assigned to one or more of the categories.

29. A computer-readable storage medium holding code for performing the method according to claim 15.

30. An apparatus for performing classification through generative models of features occurring in an image, comprising:
means for assigning each of a plurality of training images to one of a plurality of image categories;
means for identifying features occurring in each training image;
means for determining category-conditional probabilities of the features for each of the training images for their respective image categories;
means for maintaining the category-conditional probability distributions of features with one such category-conditional probability distribution assigned to each of the image categories;
means for retrieving an unclassified image and means for identifying the features occurring in the unclassified image;
means for representing each of the identified features as an element in a feature list having a variable length, each element comprising a value in a chosen space of features that comprises one or more dimensions and the value comprising measurements along each of the dimensions being either continuous or discrete valued;
means for evaluating the identified features against the category-conditional probability distributions for each of the image categories;
means for assigning the unclassified image to one image category by maximizing the category-conditional likelihood of the category-conditional probability distribution of the identified features; and
means for processing the unclassified image based on the one image category by means for converting the unclassified image.

* * * * *